US012621287B2

(12) United States Patent
    Sekar

(10) Patent No.: US 12,621,287 B2
(45) Date of Patent: May 5, 2026

(54) TRUSTED AND SECURED CLIENT-SERVER MODEL IN KUBERNETES CLUSTER PODS

(71) Applicant: OPEN TEXT INC., Menlo Park, CA (US)

(72) Inventor: Dhatchana Moorthy Sekar, Bangalore (IN)

(73) Assignee: OPEN TEXT INC., Menlo Park, CA (US)

( * ) Notice: Subject to any disclaimer, the term of this patent is extended or adjusted under 35 U.S.C. 154(b) by 0 days.

(21) Appl. No.: 18/671,494

(22) Filed: May 22, 2024

(65) Prior Publication Data

US 2025/0365277 A1 Nov. 27, 2025

(51) Int. Cl.
G06F 21/00 (2013.01)
H04L 9/40 (2022.01)
H04L 41/0663 (2022.01)

(52) U.S. Cl.
CPC ...... H04L 63/0823 (2013.01); H04L 41/0663 (2013.01); H04L 63/166 (2013.01)

(58) Field of Classification Search
CPC ...................... H04L 63/0823; H04L 41/0663; H04L 63/166
See application file for complete search history.

(56) References Cited

U.S. PATENT DOCUMENTS

| | | | |
|---|---|---|---|
| 12,393,360 B1* | 8/2025 | Knight | G06F 3/0604 |
| 2022/0222100 A1* | 7/2022 | Srivastava | G06F 9/5077 |
| 2023/0115261 A1* | 4/2023 | Xiao | G06F 9/45558 718/104 |
| 2025/0061186 A1* | 2/2025 | Sharma | H04L 9/3247 |
| 2025/0097211 A1* | 3/2025 | Uzun | H04L 63/0823 |

FOREIGN PATENT DOCUMENTS

WO WO-2023278851 A1 * 1/2023 ........ H04W 12/0431

* cited by examiner

*Primary Examiner* — Kendall Dolly
(74) *Attorney, Agent, or Firm* — Sprinkle IP Law Group

(57) ABSTRACT

Systems and methods are provided for enabling a trusted and secured client-server model in a container orchestration environment. Various embodiments provide a trusted and secured client-server model leverages the concept of self-signed TLS certificates to automate and efficiently manage TLS connections. In some embodiments a Kubernetes API server injects a service token into each pod in a cluster. The Kubernetes API server also injects the certificate used to generate the service token. In a client server model between pods, clients can use the same service token as its identity to the server and the server can use the same certificate for validating the token. In this way, trust is established using token-based authentication between clients and servers.

17 Claims, 7 Drawing Sheets

100

104

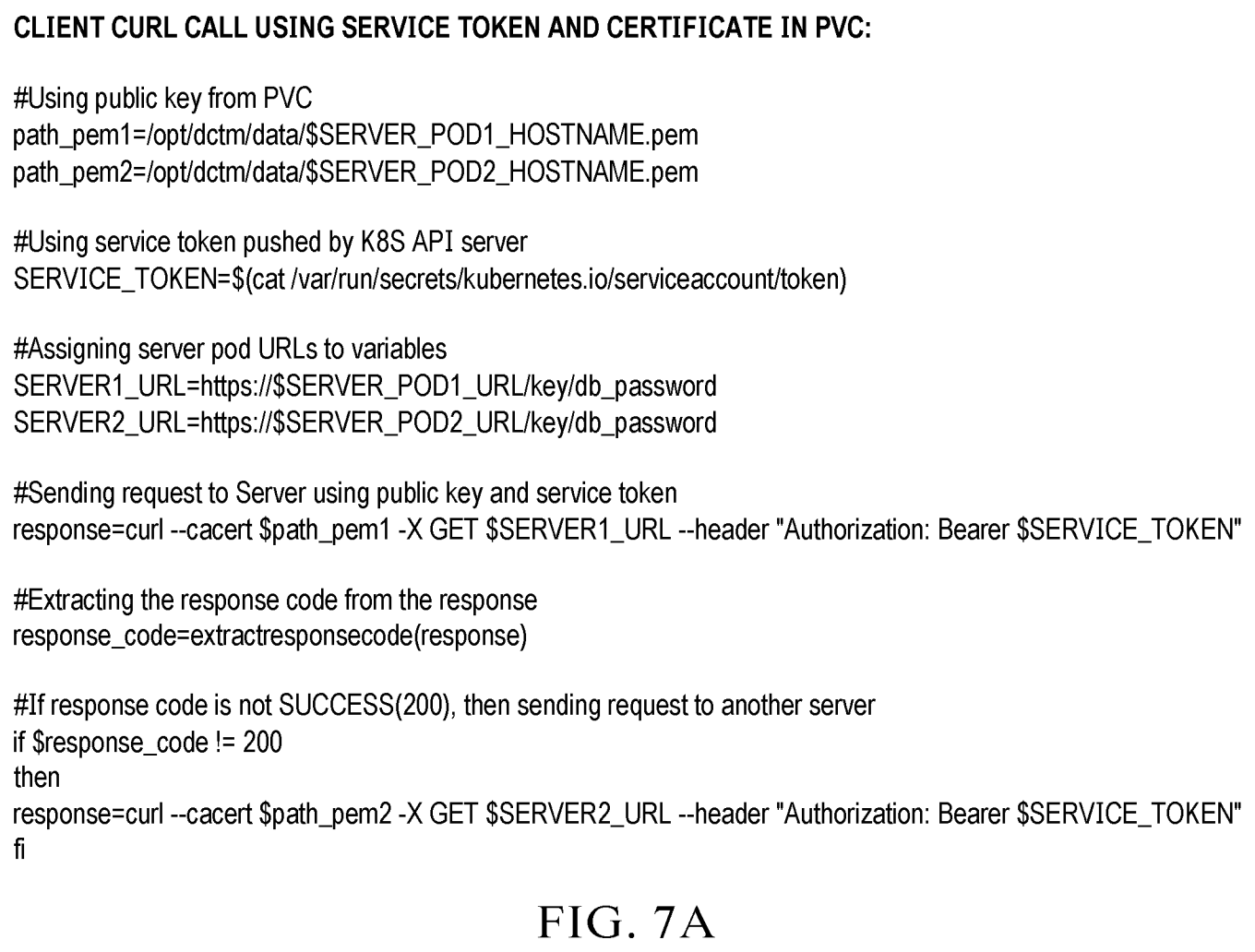

CLIENT CURL CALL USING SERVICE TOKEN AND CERTIFICATE IN PVC:

Using public key from PVC
path_pem1=/opt/dctm/data/$SERVER_POD1_HOSTNAME.pem
path_pem2=/opt/dctm/data/$SERVER_POD2_HOSTNAME.pem

Using service token pushed by K8S API server
SERVICE_TOKEN=$(cat /var/run/secrets/kubernetes.io/serviceaccount/token)

Assigning server pod URLs to variables
SERVER1_URL=https://$SERVER_POD1_URL/key/db_password
SERVER2_URL=https://$SERVER_POD2_URL/key/db_password

Sending request to Server using public key and service token
response=curl --cacert $path_pem1 -X GET $SERVER1_URL --header "Authorization: Bearer $SERVICE_TOKEN"

Extracting the response code from the response
response_code=extractresponsecode(response)

If response code is not SUCCESS(200), then sending request to another server
if $response_code != 200
then
response=curl --cacert $path_pem2 -X GET $SERVER2_URL --header "Authorization: Bearer $SERVICE_TOKEN"
fi

FIG. 7A

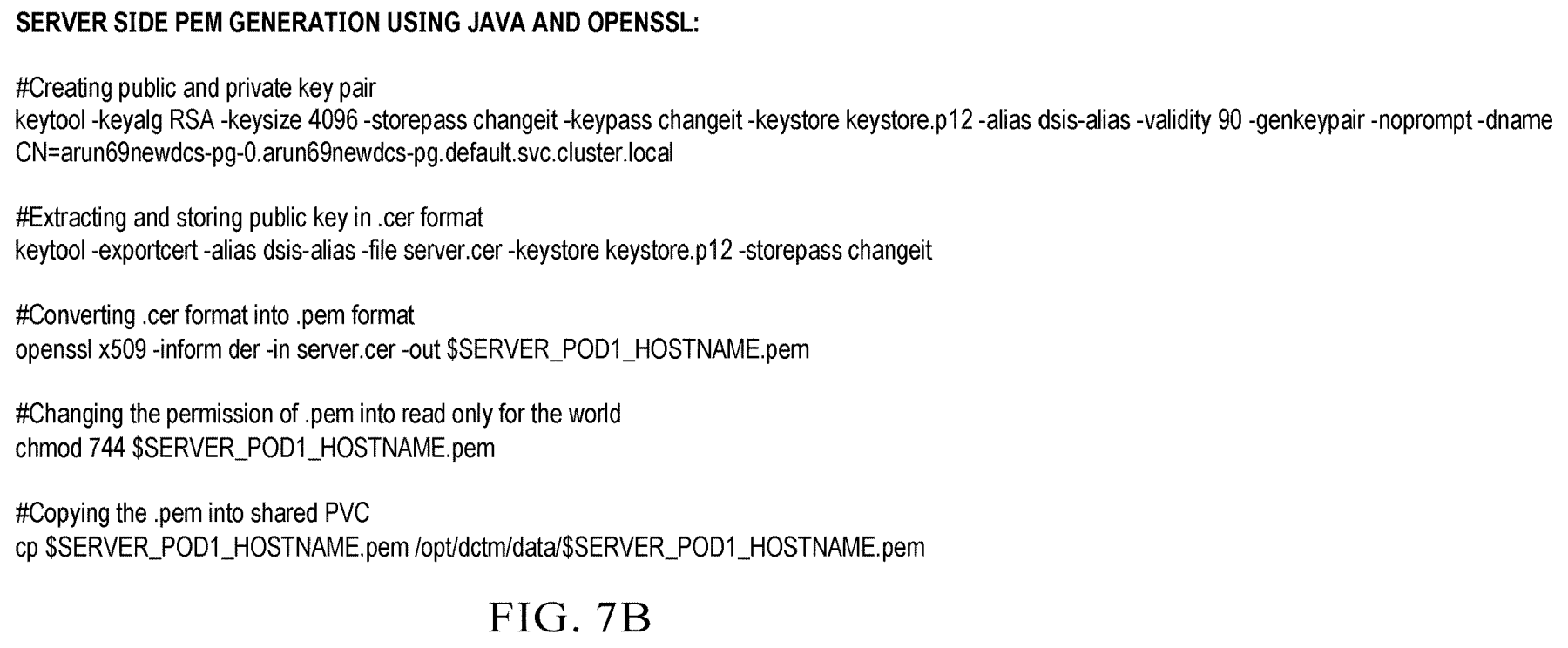

SERVER SIDE PEM GENERATION USING JAVA AND OPENSSL:

Creating public and private key pair
keytool -keyalg RSA -keysize 4096 -storepass changeit -keypass changeit -keystore keystore.p12 -alias dsis-alias -validity 90 -genkeypair -noprompt -dname CN=arun69newdcs-pg-0.arun69newdcs-pg.default.svc.cluster.local

Extracting and storing public key in .cer format
keytool -exportcert -alias dsis-alias -file server.cer -keystore keystore.p12 -storepass changeit

Converting .cer format into .pem format
openssl x509 -inform der -in server.cer -out $SERVER_POD1_HOSTNAME.pem

Changing the permission of .pem into read only for the world
chmod 744 $SERVER_POD1_HOSTNAME.pem

Copying the .pem into shared PVC
cp $SERVER_POD1_HOSTNAME.pem /opt/dctm/data/$SERVER_POD1_HOSTNAME.pem

FIG. 7B

TRUSTED AND SECURED CLIENT-SERVER MODEL IN KUBERNETES CLUSTER PODS

TECHNICAL FIELD

This disclosure relates generally to the field of content management. In particular, this disclosure relates to systems, methods, and computer program products for providing a trusted and secured client-server model in a container orchestration cloud environment.

BACKGROUND

Containerization relates to an application-level virtualization over multiple network resources enabling software applications to run in isolated user spaces called containers in a cloud or non-cloud environment. In some examples, containers are basically fully functional and portable cloud or non-cloud computing environments surrounding an application and keeping the application independent from other parallel environments. In some uses, each container simulates a different software application and runs isolated processes by bundling related configuration files, libraries, and dependencies. Container deployment is the act of deploying containers to their target environment, such as a cloud or on-premises server.

In a container orchestration cloud environment, such as Kubernetes (K8s), security is a multifaceted topic that requires attention to various aspects of cluster management, configuration, and application deployment. For example, security issues can arise from unauthenticated access to the application programming interface (API) server, insecure network policies, weak or misconfigured authentication mechanisms, insecure network configurations, etc. Kubernetes allows for the storage and management of sensitive information such as API tokens, database passwords, and transport layer security (TLS) certificates as secrets. However, mismanagement of secrets, such as storing them in plaintext or exposing them in other ways, can lead to security breaches. Using mechanisms for the management of secrets is crucial for secure secrets management.

In view of the foregoing, there is room for innovations and improvements for providing customization, release management, and maintenance in a container orchestration environment.

SUMMARY

In some embodiments, systems and methods are described for securing communications between pods in a container orchestration platform cluster that push, by a container orchestration platform API server, service tokens and certificates to a client pod and to a server pod. One or more server pods generate a self-signed certificate and store the certificate in memory. The server pod also pushes the self-signed certificate into a shared memory, where it can be pulled by a client pod and used to establish a TLS connection between the client and the server pod. In some embodiments, multiple servers can be configured to be used with an HA failover system.

Embodiments of the present invention also include computer-readable storage media containing sets of instructions to cause one or more processors to perform the methods, variations of the methods, and other operations described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 7A shows an example of pseudocode for a client curl call using a service token and certificate in PVC, as described above.

FIG. 7B shows an example of pseudocode for a server side PEM generation using java and openSSL, as described above.

DETAILED DESCRIPTION

Figure 1:
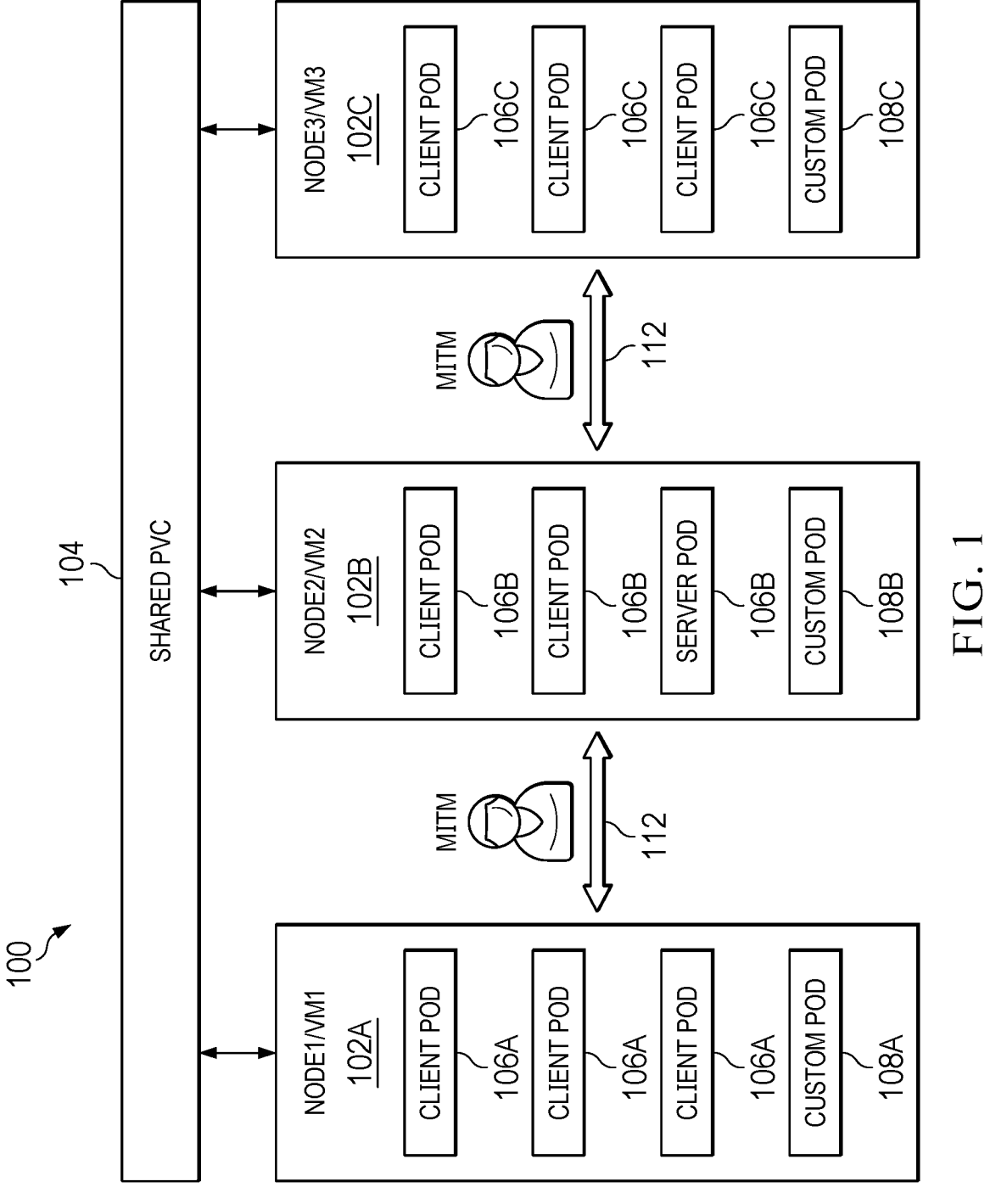
FIG. 1 is a block diagram of a Kubernetes cluster.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

For the purposes of this description, it may be helpful to understand the operation of a containerization framework for deploying containers in a container orchestration cloud environment. Commonly-owned U.S. patent application Ser. No. 18/151,271, entitled "CUSTOMIZABLE CONTAINERIZATION FRAMEWORK SYSTEM AND METHOD," filed on Jan. 6, 2023, and Ser. No. 18/151,273, entitled "CUSTOMIZABLE CONTAINERIZATION FRAME- WORK SYSTEM AND METHOD," filed on Jan. 6, 2023, each describe embodiments of customizable containerization frameworks, and are incorporated herein by reference in their entireties for all purposes.

Generally, the present disclosure describes a system and method for providing a trusted and secured client-server model in Kubernetes cluster pods. As discussed in detail below, the disclosure describes techniques that leverage the concept of self-signed TLS certificates to automate and efficiently manage TLS connections.

While concepts described in this description will be described in the context of the exemplary container orchestration platform (Kubernetes), the concepts can be applied to other container orchestration platforms. In a Kubernetes orchestration environment, a pod is a deployable unit that represents a single instance of a running process or application. In some embodiments, pods are defined using YAML or JSON manifests, which specify a respective pod's configuration, including the container image, environment variables, volumes, and other settings. A pod can contain one or more containers that share the same network namespace and storage volumes. Containers within the same pod can communicate with each other over local host. Typically, pods are considered an atomic unit of deployment in Kubernetes. Kubernetes manages the lifecycle of pods, including creation, scheduling, scaling, updating, and termination.

A Kubernetes cluster is a set of physical or virtual machines, called nodes, that are grouped together to run Kubernetes and deploy, manage, and scale containerized applications. In a Kubernetes cluster, nodes can have different roles and responsibilities, including running application workloads, managing networking, storing data, and hosting control plane components. Namespaces are virtual clusters within a Kubernetes cluster that provide a way to partition resources and logically isolate workloads. Namespaces can be used to organize and manage resources, enforce access controls, etc. Kubernetes can support various storage options for persistent data storage, including local, network, and cloud-based storage solutions. In some embodiments, persistent volume claim (PVC) resources can be used to manage storage in the cluster. TLS (Transport Layer Security) is a cryptographic protocol used to secure communication over a computer network and can be used in a Kubernetes environment. TLS communications ensures that data transmitted between two items, such as a client pod and a server pod, is encrypted, authenticated, and integrity protected, thereby preventing security breaches. TLS communication is important for securing sensitive data transmitted over computer networks, and it is widely used to protect various types of communication between clients and servers in different contexts.

As mentioned, in a Kubernetes cluster, pods are scattered across multiple nodes/machines. So, sharing secrets/passwords using typical client-server model requires trusted and secured communication to avoid MITM attack. FIG. 1 is a block diagram of a Kubernetes cluster 100. The cluster 100 includes three nodes 102A, 102B, and 102C (labeled NODE1/VM1, NODE2/VM2, AND NODE2/VM2). A shared PVC 104 is shown, which provides shared storage for the cluster 100. Each node (102A, 102B, 102C) includes various pods. In the example shown in FIG. 1, node 102A includes client pods 106A and custom pod 108A (e.g., a third-party application). Node 102B includes client pods 106B, server pod 110, and custom pod 108B. Node 102C includes client pods 106C and custom pod 108C. As mentioned above, different items in a cluster can securely communicate over TLS communications 112, as illustrated in FIG. 1. One problem addressed by the disclosed techniques is the mitigation of Man-in-the-Middle (MITM) attacks (illustrated in FIG. 1 above the TLS communications 112), typically refers to a type of cyberattack where an attacker intercepts and potentially alters or monitors communication between two parties without their knowledge or consent. In a typical MITM attack, the attacker secretly relays and possibly modifies the communication between the parties, making them believe that they are directly communicating with each other.

There are several challenges relating to establishing a trusted and secured client-server model between Kubernetes cluster pods, such as those shown in FIG. 1. For example, the following are two important challenges. The first challenge relates to the automated pod lifecycle. The restart of pods and pod lifecycles are handled by Kubernetes, and hence manual intervention to establish trust is not possible. The second challenge relates to TLS certificate management automation. As automation is a main factor, TLS certificate rotation without encountering downtime and manual intervention is a challenge.

Described in detail below are solutions to the challenges outlined above. First, trust can be established through a service token (i.e., a JSON web token (JWT token)). In some embodiments, the Kubernetes API server injects a service token, with pod identity, into each pod, and refreshes such at a default interval (e.g., one hour, etc.). A service token is a type of token relating to the identity and authentication of pods running within a cluster, enabling the pods to interact with the Kubernetes API server and other cluster resources. The Kubernetes API also injects the certificate used to generate the service token. In a client server model between pods, clients can use the same service token as its identity to the server and the server can use the same certificate for validating the token. In this way, trust is established using token-based authentication between clients and servers.

Figure 2:
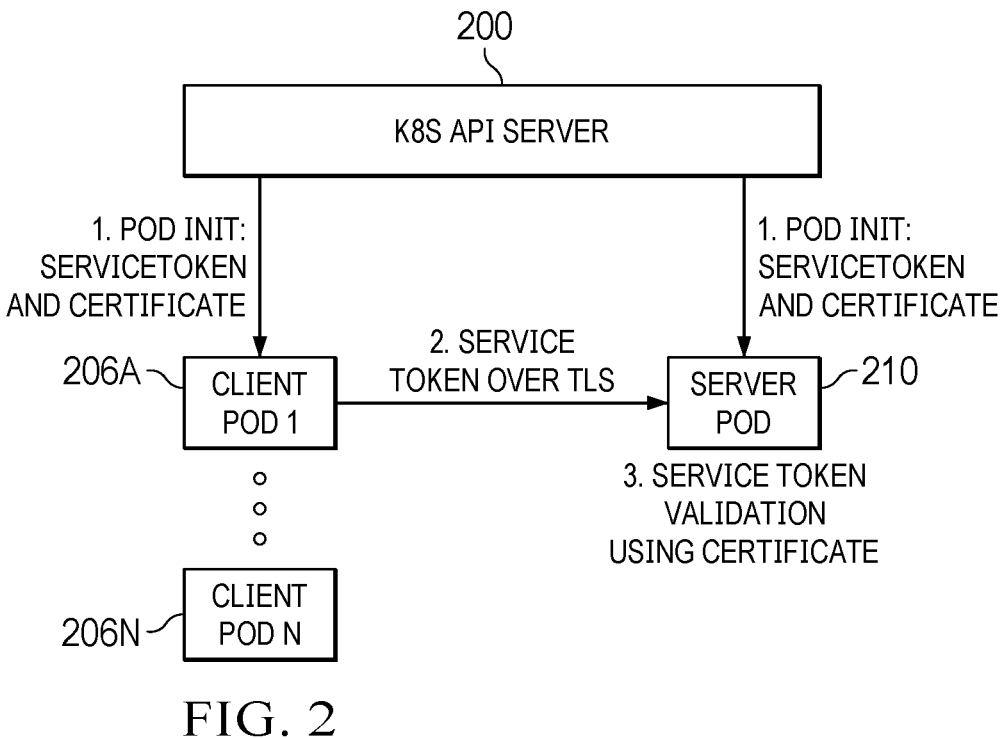
FIG. 2 is a diagram illustrating a process for trust between client and server pods established through a service token.

FIG. 2 is a diagram illustrating a process for trust between client and server pods established through a service token. FIG. 2 is described in the context of trust established between client pods 106A through 106N and server pod 210. When each pod initializes (step 1 in FIG. 2), the service token for each pod is injected into the respective pod by the Kubernetes (K8s) server 200. The service token may include items such as pod name, namespace, etc., as one skilled in the art would understand. As discussed above, the service token is refreshed at a regular interval (e.g., one hour) by default. Other intervals or schedules may also be used. Along with a service token, the Kubernetes API server 200 also injects a certificate of the service token. When client pods (206A . . . 206N) send any requests to the server pod 210 over TLS, the respective pod 206 also sends the respective service token with the request (step 2 in FIG. 2). The server pod 210 then introspects the service token using the certificate shared by Kubernetes server 200 (step 3 in FIG. 2). The service token introspection may include the server 210 validating and analyzing the properties and attributes of the token to make access control decisions or to obtain metadata associated with the token, i.e., to validate the pod identity.

Second, self-signed TLS certificates can be shared through PVC. In some embodiments, whenever a server pod starts, the service pod can create a self-signed certificate and copy the self-signed certificate into the shared PVC. The private key used to create the certificate can be generated randomly and stored only in-memory of the server pod. Whenever the client pods want to communicate with the respective server pod, the client pod will use the certificate shared in the PVC to establish a secured TLS connection with server pod.

Figure 3:
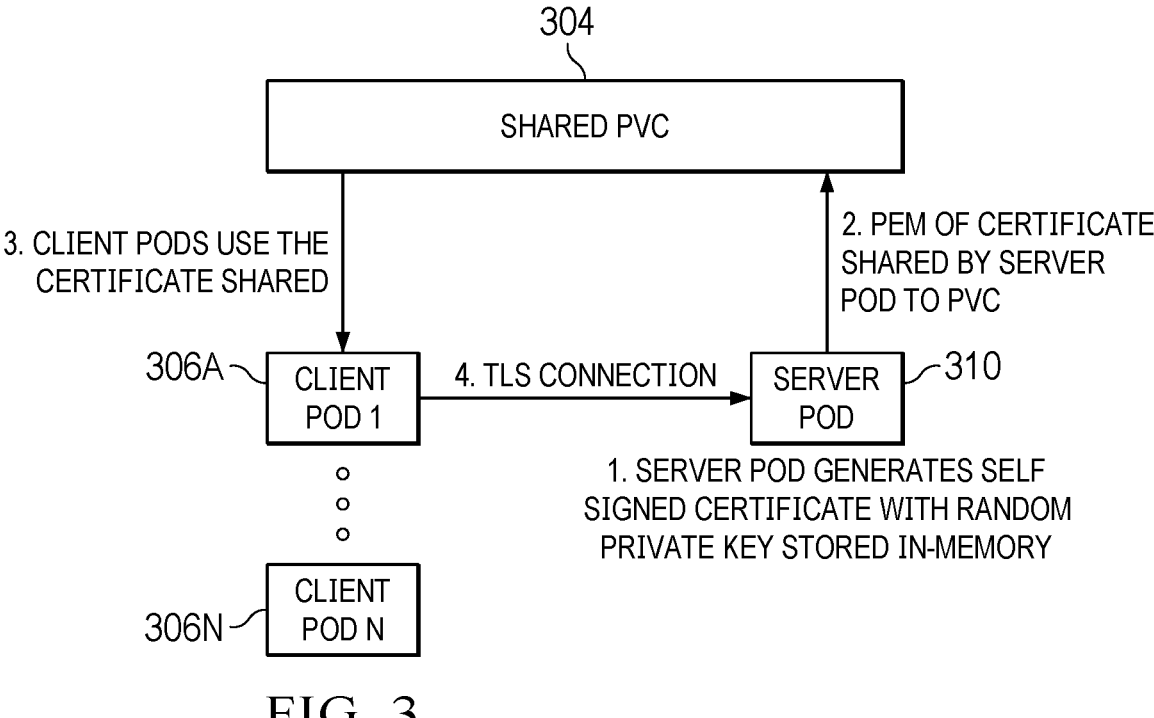
FIG. 3 is a diagram illustrating a process for trust between client and server pods established through a service token.

FIG. 3 is a diagram illustrating a process for trust between client and server pods established through a service token. FIG. 3 is described in the context of trust established between client pods 306A through 306N and server pod 310.

When the server pod 310 starts up, the server pod 310 generates a self-signed certificate with a random private key (step 1 in FIG. 3). The private key is stored in memory and is valid only until the server pod 310 restarts. Therefore, deleting the server pod 310 will cause certificate rotation, since the private key is not maintained during a restart process, and is generated again at start up. The PEM (an encoding format used for representing data such as certificates, keys, and other cryptographic objects) of the certificate is be copied to the shared PVC 304, which is shared between client pods (306A-306N) and the server pod 310 (step 2 in FIG. 3). The client pod 306A can use the certificate present in the shared PVC 304 whenever a TLS connection is required to the server pod 310 (steps 3 and 4 in FIG. 3).

Figure 4:
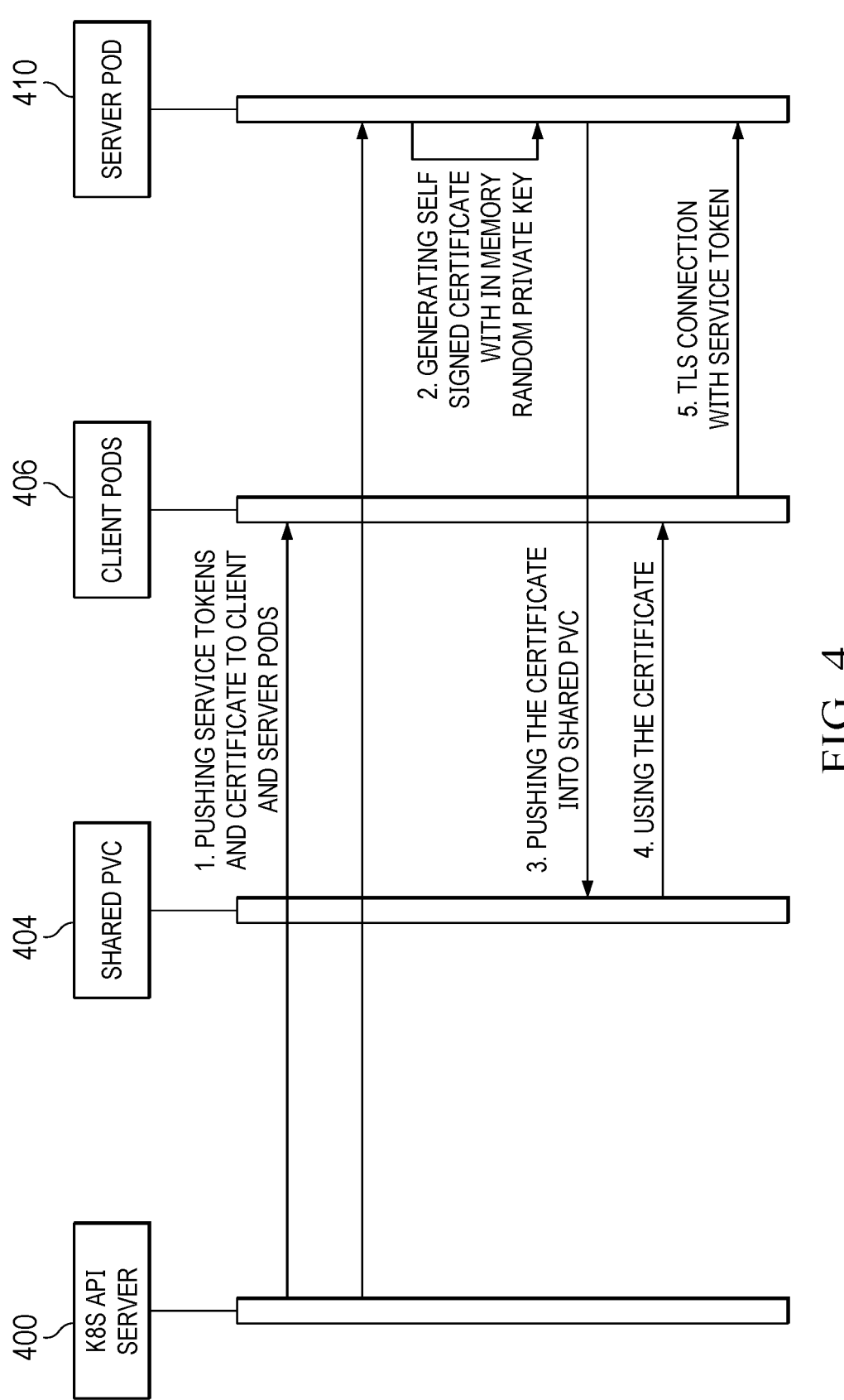
FIG. 4 is a sequence diagram illustrating an exemplary set of steps used to establish a TLS connection between client pods and a server pod.

FIG. 4 is a sequence diagram illustrating an exemplary set of steps used to establish a TLS connection, as described above. As shown in FIG. 4, When each pod initializes (discussed above with respect to step 1 of FIG. 2), the Kubernetes server 400 pushes service tokens and a certificate to client pods 406 and server pod 410. Note that FIG. 4 shows a sequence diagram for a single server. An example sequence diagram with multiple servers will be discussed below. Next, the server pod 410 generates a self-signed certificate with an in-memory random private key (see step 1 of FIG. 3). The generated self-signed certificate is pushed into the shared PVC 404 (see step 2 of FIG. 3). The client pod 406 can use the certificate present in the shared PVC 404 whenever a TLS connection is desired to the server pod 410 (see steps 3 and 4 in FIG. 3).

Figure 5:
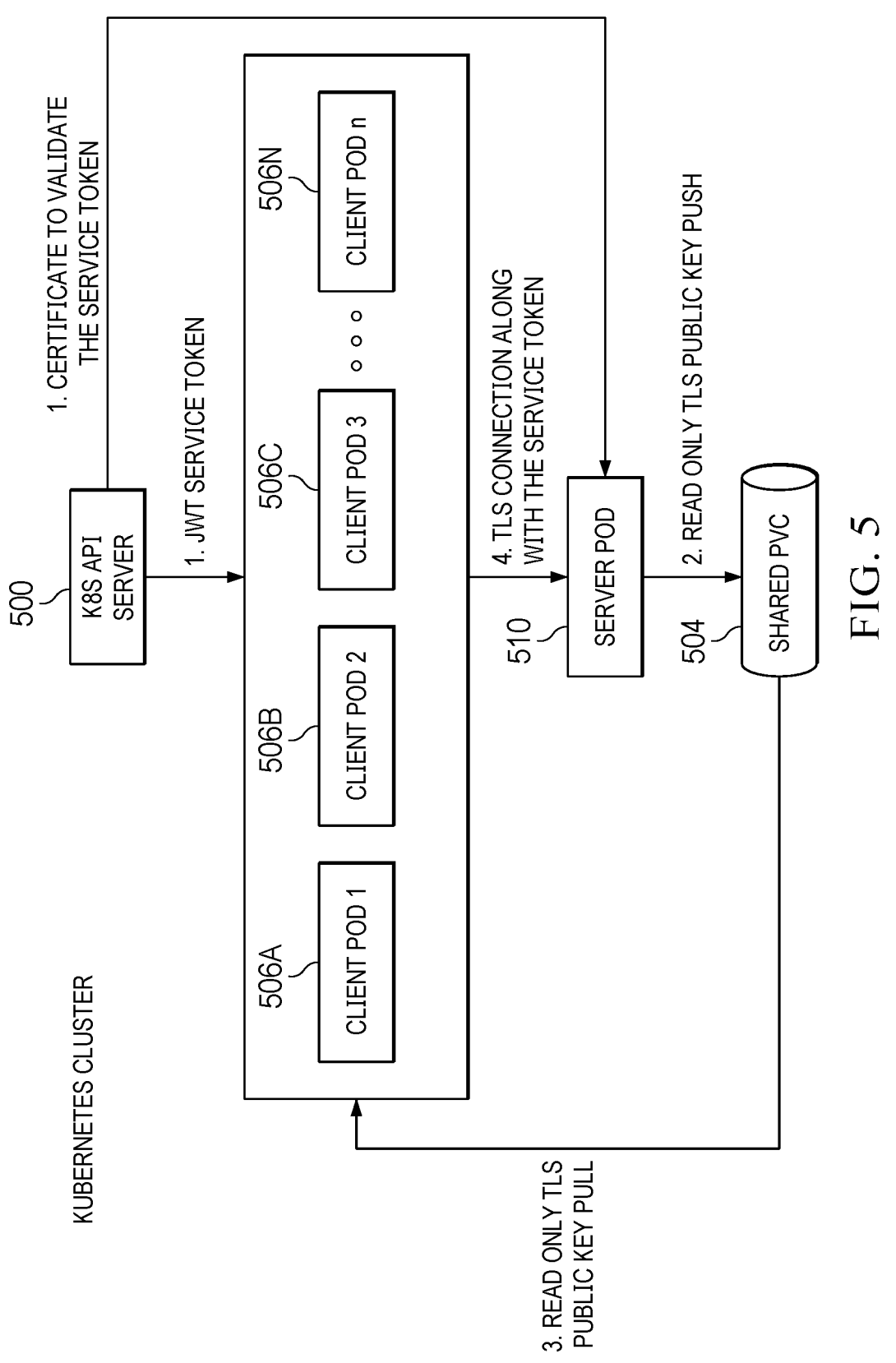
FIG. 5 is a process diagram illustrating an example of a process for trust between client and server pods.

FIG. 5 is a process diagram illustrating an example of the operation of the techniques described above. As discussed above, when each pod initializes, the Kubernetes API server 500 pushes JWT service tokens and a certificate to validate the service token (both are shown as step 1 in FIG. 5) to client pods 506A-506N and server pod 510. Next, at step 2, the server pod 510 pushes a read-only TLS public key (associated with the server pod) to the shared PVC 504 (see also step 2 of FIG. 3). When a client pod (of client pods 506A-506N) wants to establish a TLS connection, the respective client pod pulls at step 3, the read only TLS public key from the shared PVC 504 (see also step 3 in FIG. 3). At step 4, the respective client pod then uses the pulled public key and JWT service token to establish a TLS connection with the server pod 610 (see also step 4 in FIG. 3).

Figure 6:
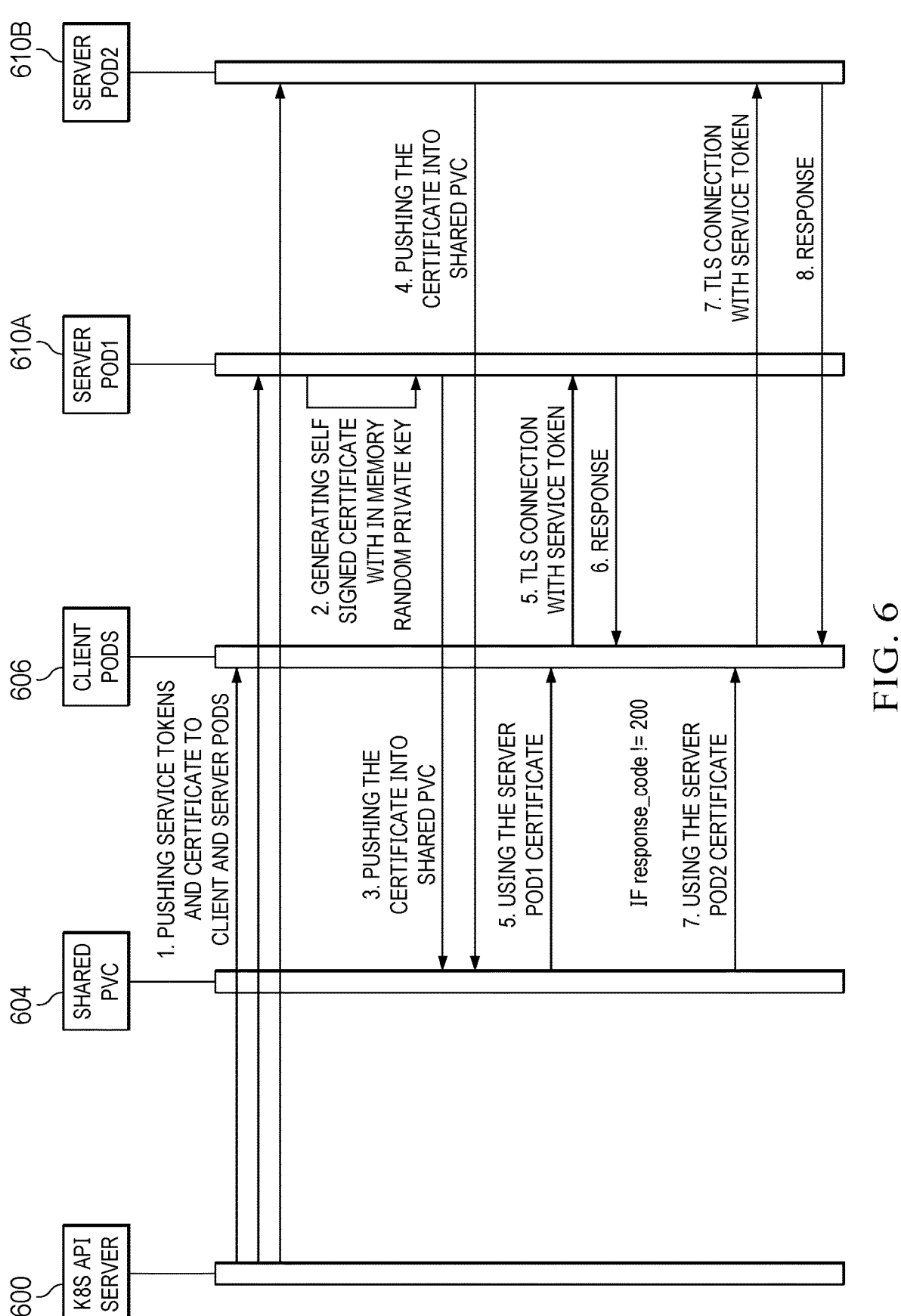
FIG. 6 is a sequence diagram illustrating an exemplary set of steps used to establish a TLS connection between client pods and one or more server pods.

FIG. 6 is a sequence diagram illustrating an exemplary set of steps used to establish a TLS connection between client pods and one or more server pods, for example for use for high availability (HA) failover. Generally, HA failover refers to the process of automatically and seamlessly transferring the workload from one server node to another server node in the event of a failure or outage, with minimal disruption to users and services. HA failover can be managed and coordinated in any desired manner, for example using the Zoo-Keeper coordination service, or a similar service, as one skilled in the art would understand.

As shown in FIG. 6, When each pod initializes (discussed above with respect to step 1 of FIG. 2), the Kubernetes server 600 pushes service tokens and a certificate to client pods 606 and server pods 610A and 610B. Next, the server pods each generate a self-signed certificate with an in-memory random private key (see step 1 of FIG. 3). The generated self-signed certificate is pushed from server pod 610A into the shared PVC 604 (see step 2 of FIG. 3). The client pod 606 can use the certificate present in the shared PVC 604 whenever a TLS connection is desired to the server pod 610A (see steps 3 and 4 in FIG. 3). If a response from the server pod 610A takes longer than a threshold time (or a failure is detected in some other manner), the client pod 606 can use the server pod 610B certificate to establish a TLS connection to the server pod 610B. Additional standby or backup server pods can also be available in the same manner. In this way, in response to a detected failure, this failover process switches the workload from the failed node to a standby or backup node. In some embodiments, the failover process is handled by the client, rather than by a server or a load balancer.

FIGS. 7A and 7B show exemplary pseudocode for the techniques discussed above. FIG. 7A shows an example of pseudocode for a client curl call using a service token and certificate in PVC, as described above. FIG. 7B shows an example of pseudocode for a server-side PEM generation using java and openSSL, as described above.

Although the invention has been described with respect to specific embodiments thereof, these embodiments are merely illustrative, and not restrictive of the invention as a whole. Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods, or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical, or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can be executed on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps, and operations described herein can be performed in hardware, software, firmware, or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present), and B is false (or not present), A is false (or not present), and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally, then, although the invention has been described with respect to specific embodiments thereof, these embodiments are merely illustrative, and not restrictive of the invention. Rather, the description is intended to describe illustrative embodiments, features, and functions in order to provide a person of ordinary skill in the art context to understand the invention without limiting the invention to any particularly described embodiment, feature, or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method of securing communications between Kubernetes pods in a Kubernetes container orchestration platform cluster, comprising:

pushing, by a Kubernetes container orchestration platform application programming interface (API) server, service tokens and certificates to a Kubernetes client pod and to a Kubernetes server pod;

generating, by the Kubernetes server pod, a self-signed certificate;

pushing, by the Kubernetes server pod, the self-signed certificate into a shared memory;

pulling, by the Kubernetes client pod, the self-signed certificate from the shared memory; and establishing a secure transport layer security (TLS) connection between the Kubernetes client pod and the Kubernetes server pod using the self-signed certificate and the service token of the Kubernetes client pod.

2. The method of claim 1, wherein the shared memory comprises a persistent volume claim (PVC).

3. The method of claim 1, wherein the service tokens are JSON web tokens (JWT).

4. The method of claim 1, wherein the self-signed certificate includes a public key associated with the Kubernetes server pod.

5. The method of claim 1, further comprising:

wherein a service token is also pushed to a second Kubernetes client pod;

pulling, by the second Kubernetes client pod, the self-signed certificate from the shared memory; and establishing a second secure transport layer security (TLS) connection between the second Kubernetes client pod and the Kubernetes server pod using the self-signed certificate and the service token of the second Kubernetes client pod.

6. The method of claim 1, wherein the service tokens and certificates are also pushed to a second Kubernetes server pod, the method further comprising:

generating, by the second Kubernetes server pod, a second self-signed certificate;

pushing, by the second Kubernetes server pod, the second self-signed certificate into shared memory;

responsive to a detected failure of the Kubernetes client pod:

pulling, by the Kubernetes client pod, the second self-signed certificate from the shared memory; and establishing a second secure transport layer security (TLS) connection between the Kubernetes client pod and the second Kubernetes server pod using the second self-signed certificate and the service token of the Kubernetes client pod.

7. A system for securing communications between Kubernetes pods in a Kubernetes container orchestration platform cluster, comprising:

a processor;

a non-transitory computer-readable medium storing instructions that, when executed by the processor, cause the processor to perform operations including:

pushing, by a Kubernetes container orchestration platform application programming interface (API) server, service tokens and certificates to a Kubernetes client pod and to a Kubernetes server pod;

generating, by the Kubernetes server pod, a self-signed certificate;

pushing, by the Kubernetes server pod, the self-signed certificate into a shared memory;

pulling, by the Kubernetes client pod, the self-signed certificate from the shared memory; and establishing a secure transport layer security (TLS) connection between the Kubernetes client pod and the Kubernetes server pod using the self-signed certificate and the service token of the Kubernetes client pod.

8. The system of claim 7, wherein the shared memory comprises a persistent volume claim (PVC).

9. The system of claim 7, wherein the service tokens are JSON web tokens (JWT).

10. The system of claim 7, wherein the self-signed certificate includes a public key associated with the Kubernetes server pod.

11. The system of claim 7, wherein the instructions further comprise:

wherein a service token is also pushed to a second Kubernetes client pod;

pulling, by the second Kubernetes client pod, the self-signed certificate from the shared memory; and establishing a second secure transport layer security (TLS) connection between the second Kubernetes client pod and the Kubernetes server pod using the self-signed certificate and the service token of the second Kubernetes client pod.

12. The system of claim 7, wherein the service tokens and certificates are also pushed to a second Kubernetes server pod, wherein the instructions further comprise:

generating, by the second Kubernetes server pod, a second self-signed certificate; pushing, by the second Kubernetes server pod, the second self-signed certificate into shared memory;

responsive to a detected failure of the Kubernetes client pod:

pulling, by the Kubernetes client pod, the second self-signed certificate from the shared memory; and establishing a second secure transport layer security (TLS) connection between the Kubernetes client pod and the second Kubernetes server pod using the second self-signed certificate and the service token of the Kubernetes client pod.

13. A computer programming product comprising a non-transitory computer-readable medium storing instructions for securing communications between Kubernetes pods in a Kubernetes container orchestration platform cluster, the stored instructions, when executed by a processor, cause the processor to perform operations including:

pushing, by a Kubernetes container orchestration platform application programming interface (API) server, service tokens and certificates to a Kubernetes client pod and to a Kubernetes server pod;

generating, by the Kubernetes server pod, a self-signed certificate;

pushing, by the Kubernetes server pod, the self-signed certificate into a shared memory;

pulling, by the Kubernetes client pod, the self-signed certificate from the shared memory; and establishing a secure transport layer security (TLS) connection between the Kubernetes client pod and the Kubernetes server pod using the self-signed certificate and the service token of the Kubernetes client pod.

14. The computer programming product of claim 13, wherein the shared memory comprises a persistent volume claim (PVC).

15. The computer programming product of claim 13, wherein the service tokens are JSON web tokens (JWT).

16. The computer programming product of claim 13, wherein the instructions further comprise:

wherein a service token is also pushed to a second Kubernetes client pod;

pulling, by the second Kubernetes client pod, the self-signed certificate from the shared memory; and establishing a second secure transport layer security (TLS) connection between the second Kubernetes client pod and the Kubernetes server pod using the self-signed certificate and the service token of the second Kubernetes client pod.

17. The computer programming product of claim 13, wherein the service tokens and certificates are also pushed to a second Kubernetes server pod, wherein the instructions further comprise:

generating, by the second Kubernetes server pod, a second self-signed certificate;

pushing, by the second Kubernetes server pod, the second self-signed certificate into shared memory;

responsive to a detected failure of the Kubernetes client pod:

pulling, by the Kubernetes client pod, the second self-signed certificate from the shared memory; and establishing a second secure transport layer security (TLS) connection between the Kubernetes client pod and the second Kubernetes server pod using the second self-signed certificate and the service token of the Kubernetes client pod.

* * * * *